United States Patent Office 3,091,567
Patented May 28, 1963

3,091,567
ENCAPSULATING AGENTS WITH CONTROLLED WATER REPELLENCY
Otto B. Wurzburg, Whitehouse Station, William Herbst, North Plainfield, and Hubert M. Cole, Belmar, N.J., assignors of one-half to National Starch and Chemical Corporation, and one-half to Firmenich Incorporated, both of New York, N.Y., both corporations of Delaware
No Drawing. Filed Feb. 17, 1961, Ser. No. 89,933
12 Claims. (Cl. 167—42)

This invention relates to a method for encapsulating substances, such as flavoring oils and perfumes, and to the products thus obtained. More particularly, this invention relates to novel water-repellant encapsulating agents and to the water-repellant encapsulated products derived therefrom. It is the object of this invention to provide encapsulating agents which, unlike those of the prior art, are characterized by their unusual water-repellancy. A further object involves the use of these encapsulating agents in the preparation of solid compositions containing entrapped therein volatile, relatively water-insoluble, flavors, perfumes and other substances, wherein it is desirable that said compositions display a controlled degree of water-repellancy and water resistance.

The use of volatile flavoring oils and perfumes in such applications as foods and cosmetics is often greatly hampered by the rapid evaporation and loss of the volatile component. Thus, although the practitioner may prepare a food, cosmetic or other product which initially contains the appropriate degree of flavor or fragrance, the ultimate consumer often finds that there has been a considerable reduction in these properties. This loss will, of course, detract from the desirability as well as from the utility of the products concerned. While we have spoken here mainly of foods and cosmetics, the same problem holds true wherever it is necessary to entrap volatile substances, whether in connection, for example, with pharmaceuticals, pesticides, detergents or the like.

Various techniques have been proposed to overcome this problem. These procedures generally involve the preparation of solid compositions containing the volatile ingredient entrapped therein. Such compositions may be prepared, for example, by mixing the volatile oil with a suitable absorbent base. In another method, the volatile materials are dispersed with solutions of various protective colloids, in which form they are dried and ground.

Of late, the technique of spray drying has found wide acceptance as a means for preparing solid particles containing entrapped flavors, perfumes or other water-insoluble, volatile substances. In this technique, the volatile oils are first emulsified in an aqueous solution of a water-dispersible protective colloid such as gelatine, gum arabic, starch or dextrine. This emulsion is then sprayed into a column of heated air or gases, which evaporates the water. It is believed that the dry particles resulting from that process comprise a shell or capsule of the dried colloid, in which the oil is imbedded, or encapsulated, in the form of minute droplets. The oil may also possibly be absorbed in the colloid base. Instead of spray drying, other drying means have also been proposed, such as spreading the emulsion on belts and passing through drying tunnels, or drying on heated drums, and the like. These procedures permit volatile, water-immiscible oils or other substances to be put into a solid, highly water-dispersible form which easily lends itself to blending with a wide variety of other ingredients, while also offering protection against the evaporation of the volatile component from the dry particles. Among the possible applications for such encapsulated oil particles, one may list their use in foods, cosmetics, spices, pharmaceuticals, soaps, detergents, bleaches, pesticides and cleansers. Other suitable uses will be apparent to those in the art, since any active ingredient may be thus entrapped.

In these applications, the encapsulated particles have heretofore always been characterized by their extreme water solubility. This property has been considered essential in order to make possible the ready release of the flavor, perfume or the like, at such time as the encapsulated particles are moistened or dispersed in water.

There are some applications, however, where it is desirable or necessary to effect a more gradual or controlled release of the entrapped substance. Thus, for instance, in making encapsulated insecticides, soil-sterilizing chemicals or weed killers, where it may be desired to obtain release of the active chemicals over a prolonged period, the use of the ordinary water-soluble encapsulating agents would give poor results. The soluble encapsulating materials would dissolve entirely too rapidly, releasing their contents prematurely. Other situations where rapid solution of the encapsulated particle would be a distinct disadvantage will be apparent to the practitioner. Although a more water repellent form of encapsulated particle would be of great value in such circumstances, the preparation of such products has not been possible, by the use of heretofore known encapsulating agents.

It is important to note that if one were to depart from the present practice of using highly water soluble encapsulating agents, such as dextrines or natural gums, and go to the other extreme of obtaining a completely water insoluble encapsulated granule, this would hardly solve the problem, since the flavors or perfumes would then be permanently imprisoned and rendered quite ineffective. Also if one were to begin by employing a completely water insoluble agent, it is not seen how such agent could be dissolved in water to serve as the medium in which to emulsify the oil or other volatile substance, prior to drying to achieve encapsulation or entrapment.

We have now solved this problem by employing as the encapsulating agent a substance which, while originally dispersible in water, forms a film upon drying which is water-repellent. The encapsulated particle produced by the use of such an encapsulating agent can be called neither completely water-soluble nor water-insoluble. Rather, it is one which permits a slow, gradual release of the entrapped material, in the presence of moisture. We refer to the encapsulated particles of our invention as having a controlled degree of water-repellency.

By the process of our invention, using the special encapsulating agents of the type herein described, we are able to obtain encapsulated particles which require a much longer exposure to moisture, as compared to particles prepared with the heretofore used water-dispersible colloids, in order to release the entrapped flavors, perfumes, or other substances. This property of controlled water-repellency causes the particles of our invention to be ideal for the encapsulation of slow-acting pesticides, sterilizing agents, certain pharmaceuticals, flavors and perfumes, where a slower, more gradual release of the entrapped substance is desirable.

As the encapsulating agent which may be dispersed in water but which forms a relatively water-repellent dried film, we prefer a particular type of starch derivative. This is the reaction product of a compound containing a polyvalent metallic ion, with an ungelatinized starch acid-ester of a substituted dicarboxylic acid. Such starch acid-esters may be represented diagrammatically by the following formula:

$$\text{Starch-O O C} - \overset{R_1}{\underset{|}{R}} - \text{C O O H}$$

where R is a radical selected from the class consisting of dimethylene and trimethylene radicals, and $R_1$ is a hydrocarbon constituent selected from the class consisting of alkyl, alkenyl, aralkyl or aralkenyl groups. The above-described ungelatinized starch acid-esters are prepared by reacting an ungelatinized starch, in an alkaline medium, with a substituted cyclic dicarboxylic acid anhydride having the following formula:

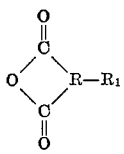

where R and $R_1$ represent the same substituent groups as are listed above for those same symbols. Substituted cyclic dicarboxylic anhydrides falling within this formula are the substituted succinic and glutaric acid anhydrides.

The starch which is used in making these derivatives may be derived from any source, including corn, wheat, potato, sago, tapioca, waxy maize, rice, sweet potato or arrowroot. It may be in its raw, unmodified state or it may have been previously modified in any desired manner, as for example by hydrolysis, oxidation, dextrinization, esterification or etherification. However, it should be in the ungelatinized form, that is, in the form of its original unbroken granules, and should remain in that form throughout the derivatization process.

As stated, the starch acid-esters are reacted with compounds containing a polyvalent metal ion. Such compounds include, for example, the water soluble salts of aluminum, copper, mercury, zirconium, iron (ferrous or ferric), chromium, tin, calcium, barium, and strontium. Further details for the manufacture of the water-repellent starch derivatives may be found in U.S. Patent 2,613,206, dated October 7, 1952.

The above-mentioned starch derivatives are remarkably resistant to wetting with water. Thus, when the starch derivative in its dry, powdered form is dropped onto water, it tends to remain as a dry mass upon the water's surface. Even after ordinary mixing with the water, it does not form a homogeneous suspension (as would ordinary starch), but rather rises to the top, still dry.

In order to wet the starch derivative so that it may be suspended (and ultimately dispersed) in water, we may employ one of several alternative methods. One method is to moisten it with a water-miscible organic solvent, such as ethanol or methanol. Another method is to moisten the starch with a water-miscible glycol such as glycerol, ethylene or propylene glycol. It may also be moistened with an aqueous ammoniacal solution. Once it has been thus moistened, it has been found that the starch derivative may then be suspended readily in water. Another method is simply to add the starch derivative to water and subject the mixture to high shear stirring, as for example with a "Lightning" mixer, or an Eppenbach stirrer. This high shear stirring, as contrasted to ordinary mixing, tends to beat the starch into the water and cause it to remain in suspension. This latter method has the advantage that it avoids the necessity for the use of organic solvents or other extraneous materials, and also appears to result in a somewhat more water-repellent ultimate encapsulated product.

The first step in the encapsulation procedure is to suspend the starch derivative in water. Methods for accomplishing this have been explained above. The starch, thus suspended in water, is then heated, with agitation, to 180°–200° F., in order to form a uniform, stable dispersion of the starch. The volatile substance to be entrapped (e.g. oil, perfume or the like) is then slowly introduced into the starch dispersion, agitation being continued until emulsification is complete. The emulsion is then dried by any suitable means, such as spray-drying, or spreading on belts and passing through a heating tunnel, or by passing over heated drums. When drying by means other than spray-drying, it is ordinarily necessary to grind the resultant dried material to the desired particle size.

The resulting encapsulated particles are, in all cases, stable, dry, free-flowing solids which are easily handled by conventional mixing or packaging apparatus without danger of breakage or other damage. When these particles are brought in contact with water, by immersion or moistening, they dissolve very slowly, releasing their entrapped oils or other entrapped substances over an extended period.

With regard to proportions, there are no critical limits. If the previously described starch derivative is employed, it ordinarily requires from about 5 parts to 100 parts or more of the organic solvent, per 100 parts of starch (by weight) in order to moisten it so as to aid its subsequent dispersion in water. If glycerol or one of the other named materials is used as the wetting agent, these proportions may vary somewhat, but it is a matter of the simplest experimentation to determine the optimum quantity. As already stated, it is possible, with proper high shear mixing, to avoid the use of wetting materials entirely.

The aqueous dispersion may have any desired solids content, although we ordinarily employ from about 15% to about 45%, by weight, of the encapsulating agent in the dispersion. The amount of volatile or non-volatile water-insoluble substance which is then emulsified in this dispersion also is subject to variation, depending upon the particular substance being employed. We have emulsified as much as 50% of the substance to be entrapped, based on the weight of the encapsulating agent in the dispersion. All types of oils, perfumes, and other relatively water-insoluble substances are fully compatible with the encapsulating agents.

The following examples will more fully illustrate the embodiment of our invention. All parts are by weight, unless otherwise indicated.

EXAMPLE I

This example illustrates the use, as an encapulating agent, of the water repellent starch derivative comprising the reaction product of aluminum sulfate and an acid converted low viscosity waxy maize acid ester of a substituted succinic acid, derived from octenyl succinic acid anhydride. This product was prepared according to the procedure described in Example IX of U.S. 2,613,206, except that as the starch base we employ a waxy maize starch which had previously been acid converted to a degree known in the trade as 85 fluidity, and the amount of the octenyl succinic acid anhydride used was 3%, based on the weight of the starch.

Five parts of the above described starch derivative were suspended in 20 parts water by high mechanical shear, in an Eppenbach homogenizer. Dispersion (i.e. gelatinization) was effected by heating the mixture with agitation for 15 minutes at a temperature of 185° F. After cooling to 110–120° F., one part of peppermint oil was added to the dispersion and agitation continued until emulsification was complete. This emulsion was then sprayed-dried in a Luwa commercial spray dryer. The input temperature of this device was 420° F. and the output 230° F.

The resulting spray-dried particles were easily handled, relatively free flowing, extremely stable to variations in temperature and relative humidity, and water repellent.

EXAMPLE II

This example illustrates the use, as encapsulating agents, of a number of different water repellent starch derivatives. The derivatives employed were as follows:

(1) The reaction product of magnesium sulfate and a low viscosity acid converted corn starch acid ester of a substituted succinic acid (derived from decenyl succinic anhydride). This was prepared according to the procedure of Example I of U.S. 2,613,206, except that as the starch base we used a corn starch which had been acid converted to a degree known in the trade as 75 fluidity, and magnesium sulfate was employed instead of aluminum sulfate. In this and the subsequent examples, the amount of acid anhydride employed was as shown in the following table.

(2) The reaction product of aluminum sulfate and a sodium hypochlorite oxidized corn starch acid ester of a substituted succinic acid (derived from octenyl succinic acid anhydride). This was prepared according to the procedure of Example IX of U.S. 2,613,206, except that the starch base was a corn starch which had previously been oxidized with sodium hypochlorite to a degree known in the trade as 85-90 fluidity.

(3) The reaction product of aluminum sulfate and a tapioca starch acid ester of a substituted succinic acid (derived from octenyl succinic acid anhydride). This had been prepared according to the procedure of Example VII of U.S. 2,613,206, except that tapioca starch was used as the starch base, and aluminum sulfate was used as the polyvalent metal salt.

(4) The reaction product of aluminum sulfate and a waxy maize starch acid ester of a substituted glutaric acid (derived from heptyl glutaric acid anhydride). This was prepared according to the procedure of Example II of U.S. 2,613,206, except that a waxy maize starch (acid converted to 85 fluidity) was used as the starch base, and aluminum sulfate was used as the polyvalent metal salt.

(5) The reaction product of aluminum sulfate and a thin boiling potato starch acid ester of a substituted succinic acid (derived from octadecenyl succinic acid chloride). This was prepared according to the procedure of Example VI of U.S. 2,613,206, except that the potato starch employed was one which had been acid-converted to a degree known in the trade as 90 fluidity, and the polyvalent metal salt was aluminum sulfate instead of copper sulfate.

(6) The reaction product of aluminum sulfate and a thin boiling waxy sorghum starch acid ester of a substituted succinic acid (derived from octenyl succinic acid anhydride). This was prepared according to the procedure of Example IX of U.S. 2,613,206, except that the starch base was a waxy sorghum acid converted to a degree known in the trade as 85 fluidity.

Each of the above derivatives was dispersed as described in Example I hereinabove, and emulsions of various water-insoluble substances were prepared, as described in that example. The emulsions were dried under conditions described in the following table. In that table there are also listed the proportions of water and water-insoluble substance used in making the emulsions. It should be noted that in all cases the resulting dried particles were comparable in their properties, and particularly with regard to their water repellency, to the particles described in Example I.

EXAMPLE III

Example I was repeated, except that the starch derivative, before being suspended in water, was first wetted with ethanol, in the proportion 5 starch:2 ethanol. Dispersion was then effected by adding 20 parts water and heating as set forth in Example I. The starch suspended and dispersed readily in the water. All other materials, proportions and procedures were the same as in Example I, and the encapsulated particles were characterized by the same advantageous properties, but with very slightly less water repellency.

EXAMPLE IV

A dispersion of the starch derivative was prepared as in Example III, and peppermint oil emulsified therein in the same manner as in that example. However, instead of spray-drying the emulsion, it was passed over heated drums to produce the dried product. The dry material was then ground to 60 mesh on a Wiley mill. When 1 part by weight of the dry particles was mixed with 100 parts of water, it was found that the particles were quite insoluble and hydrophobic, and released the oil at a very slow rate.

EXAMPLE V

This example illustrates the controlled water repellency of the particles encapsulated according to the process of our invention, as compared to particles prepared from one of the conventional water-soluble encapsulating agents.

Five parts of the spray-dried particles prepared according to the procedure of Example I were placed in a vessel containing 100 parts of water. At the same time, an identical quantity of spray-dried particles which had been prepared with a yellow corn dextrine as the encapsulating agent were placed in another vessel, which also contained 100 parts of water. Except for the fact that these latter particles had been encapsulated with a different material, they were similar in regard to proportions and materials encapsulated. The only difference in procedure was, of course, that the water-soluble dextrin encapsulating agent did not require either wetting out with a water-miscible organic solvent or high shear stirring in order to effect dispersion.

After being placed in the water, the dextrin-encapsulated particles dissolved almost immediately, and at once released their imbedded droplets of peppermint oil. On the other hand, the particles which had been encapsulated with the water-repellent derivative merely floated upon the surface of the water. It was only after 32 hours had elapsed that a number of the particles were suf-

*Table I*

| Derivative No. | Base Starch | Substituent Group | Metallic Ion | Starch/$H_2O$ Ratio | Oil/Concentration on Starch | Drying Method |
| --- | --- | --- | --- | --- | --- | --- |
| 1 | 75 fluidity corn | 3% decenyl succinic acid anhydride. | Mg | 1:5 | Lemon/20% | Luwa Spray Dryer. |
| 2 | 85-90 fluidity corn | 5% octenyl succinic acid anhydride. | Al | 1:4 | Vanilla/20% | Niro Spray Dryer. |
| 3 | Tapioca | 8% octenyl succinic acid anhydride. | Al | 1:15 | Corn Oil/15% | Drum Dryer (Emulsion passed over heated drums; dried material then ground to 60 mesh). |
| 4 | 85 fluidity waxy maize. | 2% heptyl glutaric acid anhydride. | Al | 1:4 | Eugenol/20% | Niro Spray Dryer. |
| 5 | 90 fluidity potato starch. | 4% octadecenyl succinic acid anhydride. | Al | 1:4 | Spearmint/30% | Do. |
| 6 | 85 fluidity waxy sorghum. | 5% octenyl succinic acid anhydride. | Al | 1:4 | 1,2 dibromo 3 chloropropane/20%. | Bowen Spray Dryer. | ficiently wet so as to release the oil. Complete solution, however, was not effected until a period of more than 72 hours had elapsed.

It is understood, of course, that when the encapsulated particles are to be used in foods, a non-toxic encapsulating agent will be chosen.

Summarizing, our invention provides a new type of encapsulating agent, comprising any substance which can be dispersed in water, but which upon drying forms a water-repellent film, and for the first time makes possible the production of particles of entrapped water-insoluble substances characterized by a controlled degree of water-repellency. If desired, the water-repellent encapsulating agents of our invention may be used in combination with the conventional water-soluble agents (such as dextrines or gums) of the prior art.

Variations may be made in proportions, materials and procedures without departing from the scope of this invention, which is limited only by the following claims.

We claim:

1. A method for entrapping water-insoluble substances which comprises making an aqueous dispersion of an encapsulating agent which forms water-repellent films upon drying, emulsifying in said dispersion the substance to be entrapped, and then drying the emulsion, producing particles which permit a slow, gradual release of the entrapped substance in the presence of moisture.

2. The method of claim 1 in which the encapsulating agent is the reaction product of a compound containing a polyvalent metal ion with a starch acid-ester of a substituted dicarboxylic acid having the following formula:

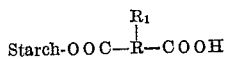

where R is a radical selected from the class consisting of dimethylene and trimethylene radicals, and $R_1$ is a hydrocarbon constituent selected from the class consisting of alkyl, alkenyl, aralkyl and aralkenyl groups.

3. The method of claim 1 in which the substance to be entrapped is selected from the class consisting of water-insoluble flavoring oils, perfumes and pesticides.

4. The method of claim 1 in which the emulsion is dried by spray-drying.

5. The method of claim 1 in which the emulsion is dried by passing over heated drums.

6. A method for encapsulating water-insoluble substances which comprises making an aqueous dispersion of an encapsulating agent comprising the reaction product of a compound containing a polyvalent metallic ion with a starch acid-ester of a substituted dicarboxylic acid having the following formula:

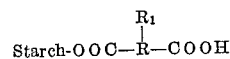

where R is a radical selected from the class consisting of dimethylene and trimethylene radicals, and $R_1$ is a hydrocarbon constituent selected from the class consisting of alkyl, alkenyl, aralkyl and aralkenyl groups, the dispersion containing from 15% to 45% by weight of said encapsulating agent, emulsifying the water-insoluble substance in said dispersion, and then spray-drying the emulsion, thus forming dry, free-flowing particles containing the substance encapsulated therein and having a controlled degree of water-repellency.

7. The method of claim 6 in which the water-insoluble substance is selected from the class consisting of flavoring oils, perfumes and pesticides.

8. A dry, free-flowing particle characterized by a controlled degree of water-repellency, said particle comprising a water-repellent encapsulating agent and a water-insoluble substance entrapped therein, said particle permitting a slow, gradual release of the entrapped substance in the presence of moisture.

9. A dry, free-flowing particle characterized by a controlled degree of water-repellency, said particle comprising a water-repellent encapsulating agent and a volatile, water-insoluble substance entrapped therein, said particle permitting a slow, gradual release of the entrapped substance in the presence of moisture.

10. A dry, free-flowing particle characterized by a controlled degree of water-repellency, and containing a water-insoluble substance entrapped therein, said particle comprising the dried product of an emulsion of a water-insoluble substance in an aqueous dispersion of an encapsulating agent comprising the reaction product of a compound containing a polyvalent metal ion with a starch acid-ester of a substituted dicarboxylic acid having the following formula:

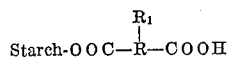

where R is a radical selected from the class consisting of dimethylene and trimethylene radicals, and $R_1$ is a hydrocarbon constituent selected from the class consisting of alkyl, alkenyl, aralkyl and aralkenyl groups.

11. A dry, free-flowing particle characterized by a controlled degree of water-repellency, said particle resulting from spray-drying an aqueous emulsion of a volatile, water-insoluble substance, said emulsion having dispersed therein as an encapsulating agent the reaction product of a compound containing a polyvalent metal ion with a starch acid-ester of a substituted dicarboxylic acid having the following formula:

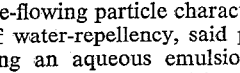

where R is a radical selected from the class consisting of dimethylene and trimethylene radicals and $R_1$ is a hydrocarbon constituent selected from the class consisting of alkyl, alkenyl, aralkyl and aralkenyl groups.

12. The particle of claim 11 in which the volatile, water-insoluble substance is selected from the class consisting of flavoring oils, perfumes and pesticides.

References Cited in the file of this patent

UNITED STATES PATENTS

| | | |
|---|---|---|
| 2,759,300 | Hartley | Aug. 21, 1956 |
| 2,876,160 | Schock et al. | Mar. 3, 1959 |
| 3,056,728 | Ohtaki | Oct. 2, 1962 |

OTHER REFERENCES

Whistler, "Industrial Gums," Academic Press, New York, 1959, pp. 675 and 684.